US005622342A

United States Patent [19]
Mills

[11] Patent Number: 5,622,342
[45] Date of Patent: Apr. 22, 1997

[54] VERSATILE APPARATUS FOR SUPPORTING CAMERAS, SPOTTING SCOPES AND OTHER DEVICES

[76] Inventor: James E. Mills, 13805 Shady Shores Dr., Tampa, Fla. 33613-4141

[21] Appl. No.: 329,484

[22] Filed: Oct. 26, 1994

[51] Int. Cl.[6] .................................................. A47G 29/00
[52] U.S. Cl. .................. 248/126; 248/219.4; 248/278.1; 248/558
[58] Field of Search ................ 248/126, 219.4, 248/176, 168, 558, 309.1, 278, 288.1; 354/81, 293; 352/243

[56] References Cited

U.S. PATENT DOCUMENTS

| 856,610 | 6/1907 | Steindorf | 248/126 |
|---|---|---|---|
| 2,188,237 | 1/1940 | Weaver | 248/168 |
| 2,375,214 | 5/1945 | Creedon | 248/126 |
| 2,806,416 | 9/1957 | Jones, Jr. | 352/243 |
| 3,351,988 | 11/1967 | Jamieson | 354/293 |
| 4,029,246 | 6/1977 | Woodruff | 224/42.45 B |
| 4,150,733 | 4/1979 | Plummer | 248/168 |
| 4,325,529 | 4/1982 | Seebinger | 248/219.4 |
| 5,037,053 | 8/1991 | Fox et al. | 248/278 |
| 5,109,411 | 4/1992 | O'Connell | 248/278 |
| 5,360,196 | 11/1994 | DiGiulio et al. | 352/243 |

FOREIGN PATENT DOCUMENTS 2378232  9/1978  France ................................ 248/168

*Primary Examiner*—Alvin C. Chin-Shue
*Assistant Examiner*—Anita M. King

[57] ABSTRACT

A versatile portable support for cameras, spotting scopes, and other devices is shown secured to a collateral support object (tree). A rope or the like is attached to a central hub member (FIG. 4), and encircled about a collateral support object one or more times, and then tightly placed in rope gripping clamps (FIG. 9). An optical device attachment assembly (FIG. 14), is removably coupled to an arm member (FIG. 10), which rotably and extendably supports cameras, spotting scopes, and other devices. My support is also shown configured so as to stand, tripod-like, on a generally horizontal surface. A central hub member (FIG. 4), houses an arm member hub (FIG. 11) and an elongated leg hub member (FIG. 7). Rotation of cam lock knob (FIG. 5), disengages central hub member (FIG. 4), enabling rotational adjustment of tree leg assembly (FIG. 8), plural elongated leg assembly (FIG. 6), and arm member (FIG. 10), about central rotational axis 69 of central hub member (FIG. 4).

27 Claims, 11 Drawing Sheets

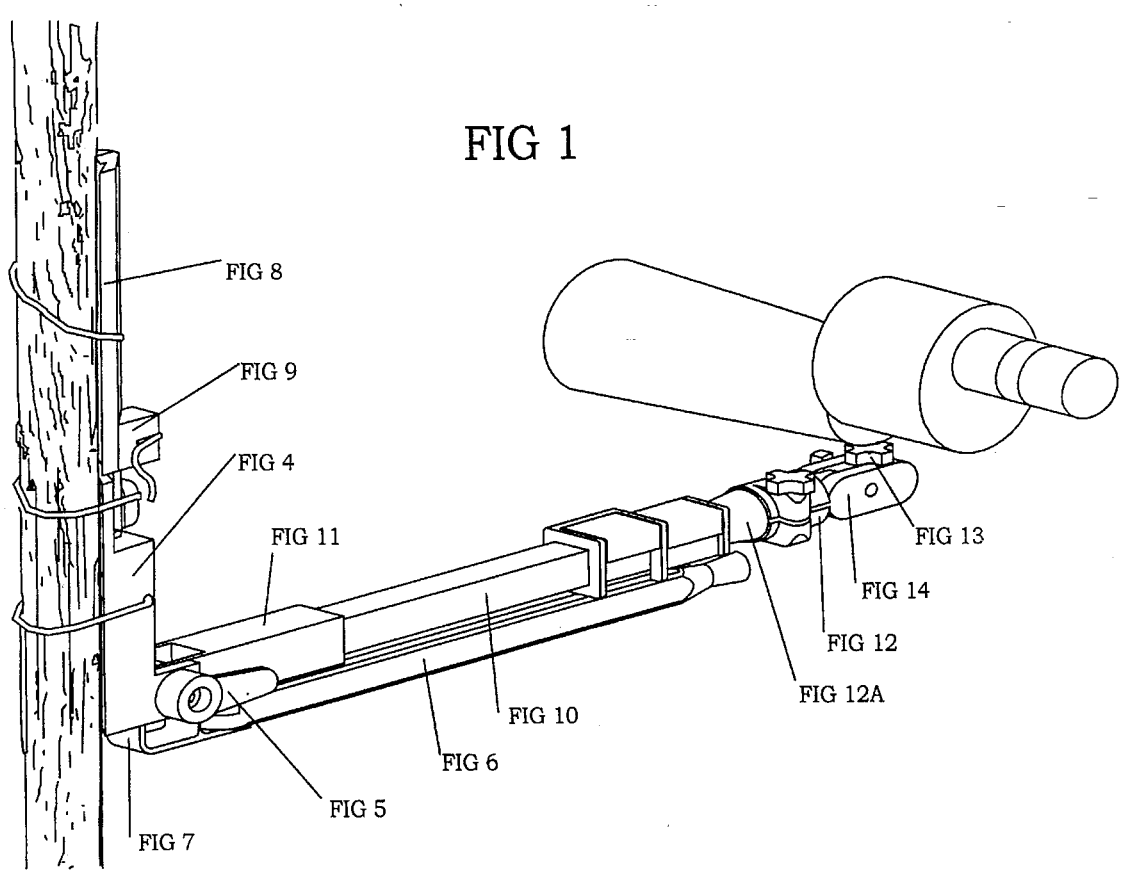

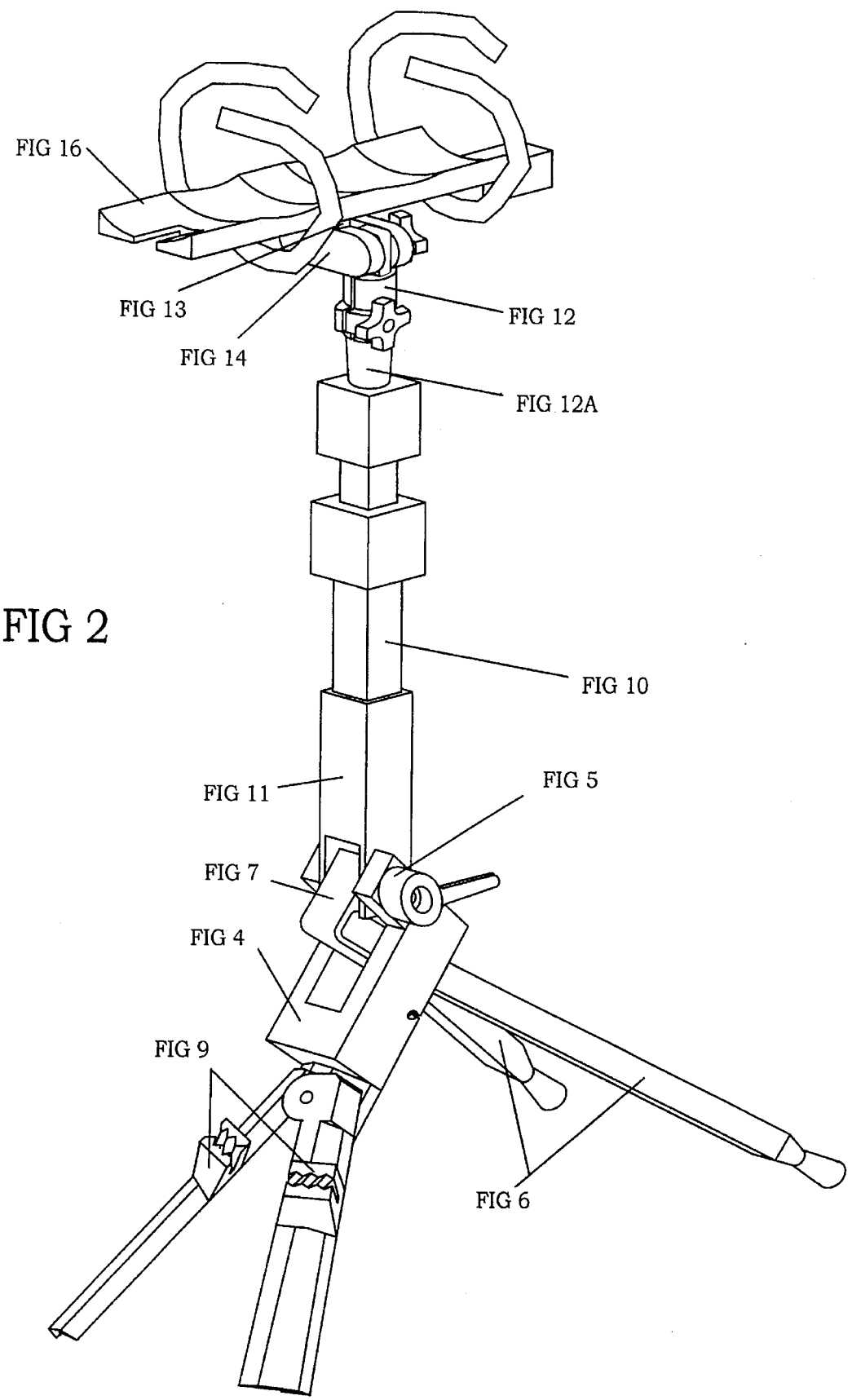

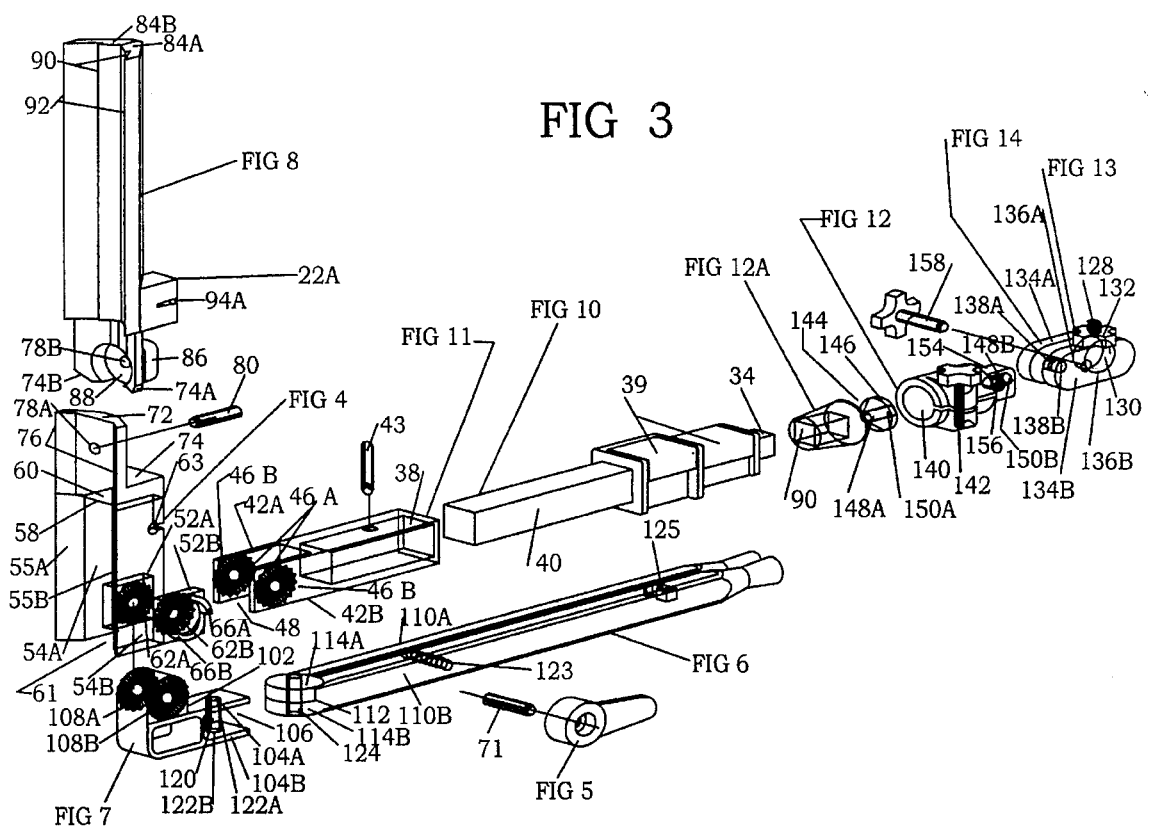

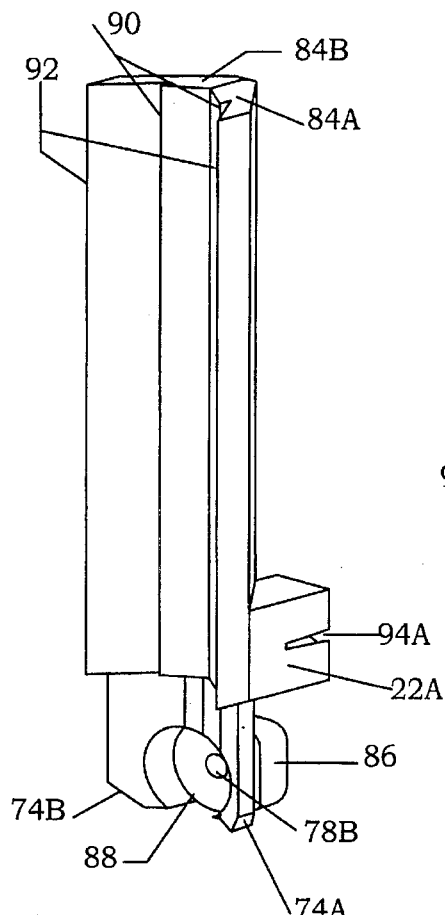
FIG 8
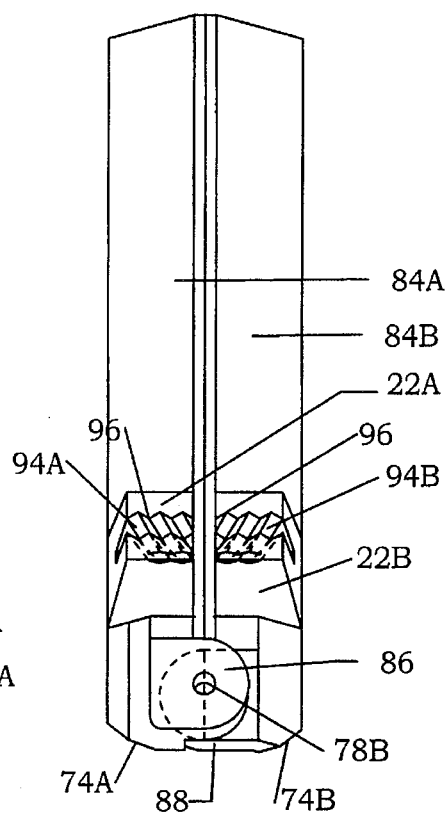
FIG 9
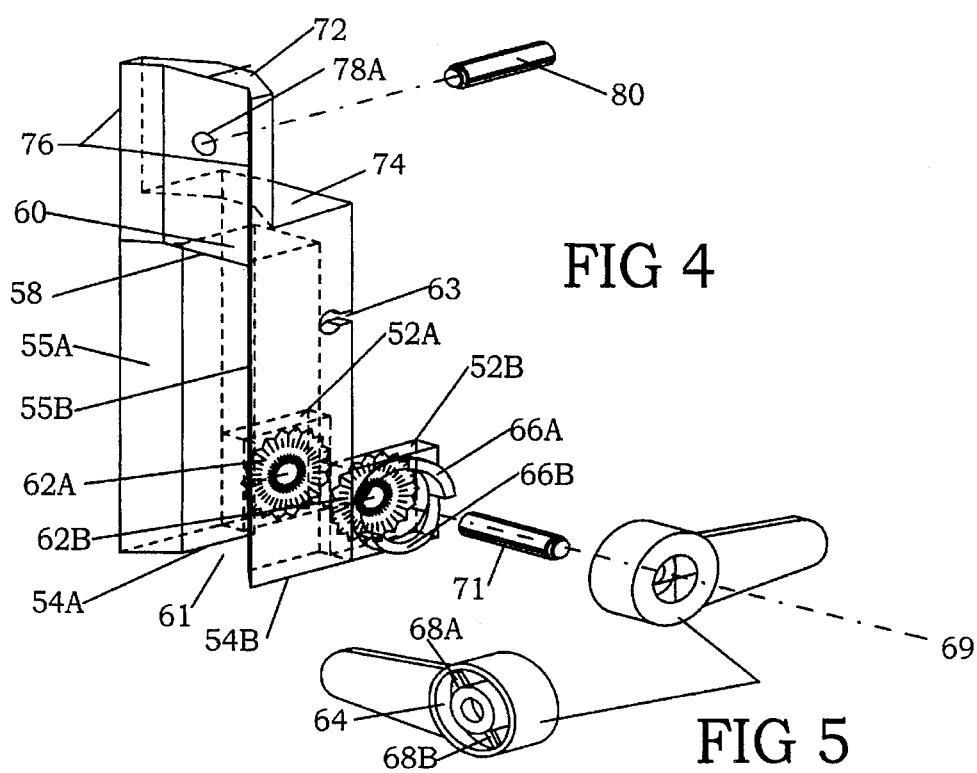
FIG 4
FIG 5

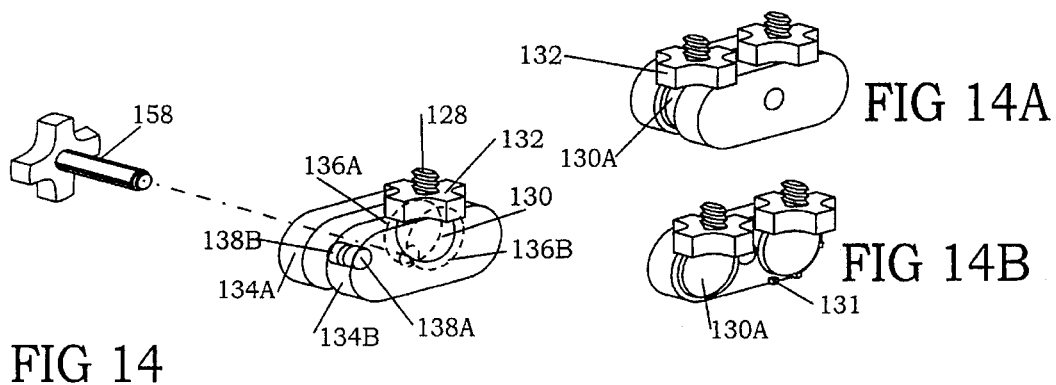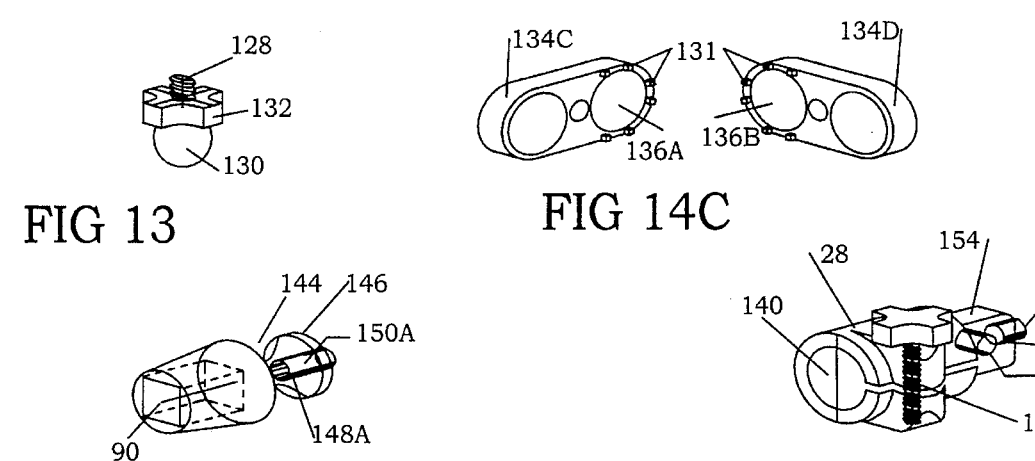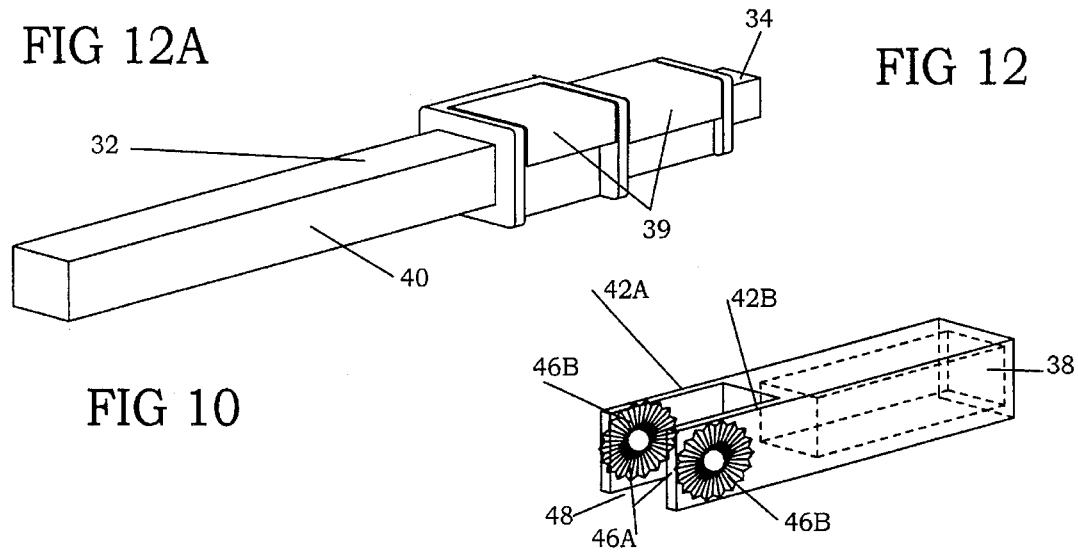

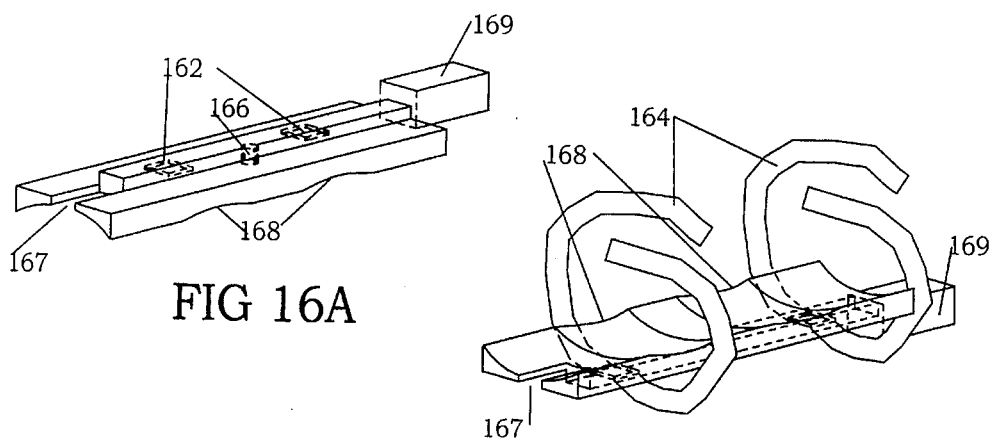
FIG 16A
FIG 16
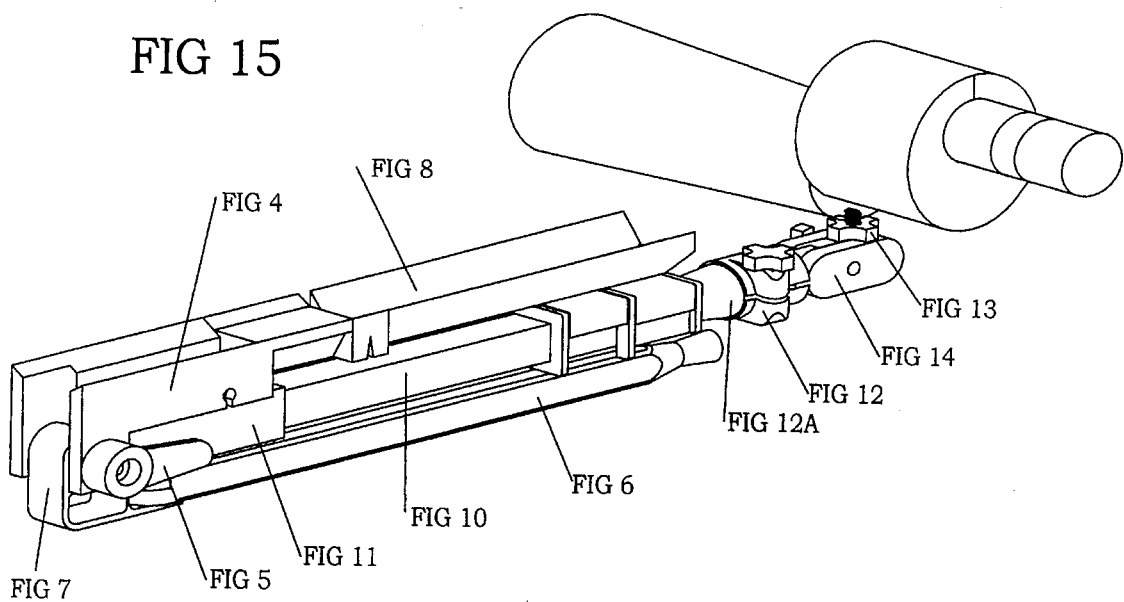
FIG 15

VERSATILE APPARATUS FOR SUPPORTING CAMERAS, SPOTTING SCOPES AND OTHER DEVICES

BACKGROUND—DESCRIPTION OF PRIOR ART

Supports for optical devices have long been used to add needed stability. Photographic devices require stability to accommodate various exposure settings. Telescopes require stability to accommodate various levels of magnification. Firearms require stability to accommodate accuracy. While there are many support devices designed to provide such stability, most are somewhat bulky, weighty, and inconvenient to carry afield. When traditional support devices are sized and weighted to make them more convenient to carry afield, they all suffer from significant limitation, such as being too short. Hunters, hikers, campers, skiers, climbers and other outdoor enthusiasts are in need of a support device that does not suffer from the limitations of current such devices.

U.S. Pat. No. 4,439,032 to Jon M. Congdon (Mar. 27, 1994), Congden discloses a portable camera support which includes a conventional camera mounting assembly affixed to a stationary leg. Congdon's device is suitable for supporting small cameras on table tops or even attached to some companion objects by use of a hook and loop strap. This device fails to meet many needs of the outdoor user. When deployed in a three-legged mode, the three legs are not adjustable. This is a serious limitation when the user is on uneven or angular terrain. Further, this device has no provision for panning horizontally, while at the same time maintaining the camera mounting assembly in a rigid state so as to prevent the camera from falling or rotating out of the horizontal plane; it is instead, expected that the user will rotate the entire device upon the horizontal support surface to effectuate a panning motion. This is a serious limitation when used on uneven or angular terrain. Further, while it is suggested that other conventional camera mounting assemblies may be employed, no provision is made for the attachment of such assemblies. Further, when Congdon's device is attached to a companion support object, such as a tree, the camera mounting assembly is in very close proximity to the support object. This is a very serious limitation for the user of video cameras, spotting scopes and other devices that require adequate clearance for panning and rotation to accommodate the view desired by the user. Further, When using a companion support device such as a tree, it will frequently be desirable for the user to comfortably seat himself on the ground or other surface and adjustably support a camera or other optical device above or to the side of his head so as to position an optical device in front of the users eyes for convenient hands free viewing. Congdon's device is not capable of such use. Further, Congden recommends the use of a hook and loop strap, attached to his device as a means to attach it to companion support objects. Frequently, the user will need to utilize a support object that is too large or bulky for the attached hook and loop material strap. Since the device has no provision for securely, conveniently, quickly and releasably locking the securing strap other than the use of Velcro on the strap itself, the user will not be able to conveniently substitute another longer or more suitable attachment method, such as a rope or cord. Further, the outdoor user will often need to use a support device in an area where there is no tree or other like companion support, and where there is no horizontal flat table top like support available at a usable height. Because Congdon's device is not capable of vertical extension, it is impossible to adjust the vertical height of the camera independently of the companion support object. This is a most serious limitation.

Yet another commercially available product is the Cullman Travelpod, by Cullmann. This device resembles Congdon's device but is further limited in that it provides no means for attachment to a companion support object, and no means for adjustment for varied terrain. It is limited to level horizontal surfaces, or hand held use.

in U.S. Pat. No. 1,198,766 to Burt Ramsay (Sep. 19, 1916), Ramsay discloses a tripod type camera support utilizing a single non extendable leg offset against an opposing leg incorporating a pivoting split leg design. Additionally, each of the three feet of the legs is knife edged. Ramsay's support is seriously limited in that no provision is made to secure it to vertical companion support objects except those of soft enough material to receive the knife edged feet. Further, such feet will tend to do serious and lasting damage to the companion support object, or to horizontal support objects such as auto hoods, tables etc. without installation of some form of protective device, adding to it's inconvenient use. Further, there is no capability of vertical or horizontal extension, further limiting the utility of the device. Further, the provided system for attachment to companion support devices is inherently dangerous in that a valuable camera or scope may be damaged by the likely loosening and dislodging of the knife feet in use. Further, Ramsay's device cannot be conveniently adjusted so as to dispose each component in parallel and compact relation to one another, all oriented in the same direction, so as to achieve minimum length and compactness when in a folded state.

In U.S. Pat. No. 1,170,096 to James M. Nicholson (Feb. 1, 1916) Nicholson discloses a tripod, with sharp feet on each tripod leg. He teaches that the tripod is to be used in a manner similar to the Ramsay device. Nicholson's device suffers from the same limitations as the Ramsay device.

The Bogen Super Clamp System by Bogen Photo Corp is a commercially available product. The Bogen Super Clamp System is an expensive family of devices designed to enable the user to support photo devices in a variety of ways. The basis of the system is a friction-lined and screw operated jawed device. Once the jawed device is attached to a companion support object, other attachments and devices can be affixed to the clamp. Such attachments are designed to secure to photographic equipment so as to support the equipment in a stable and convenient position. Such auxiliary attachment devices include The Bogen Magic Arm System. The Magic Arm System is a two armed device, jointed elbow like, adjustable elbow like, and attachable to the Super Clamp System. Because all of the auxiliary support attachments are dependent upon the limitations of the Super Clamp itself, the system is useful only when in the proximity of a sturdy companion support object of no more than two inches wide. Even if the Super Clamp were constructed so as to fit large companion support objects the device would suffer from excessive bulk, weight, complexity of use, multiple parts, and excessive expense. Further, the Super Clamp System makes no provision for the support of photo devices on solid, planar type surfaces like tables, auto hoods, or the ground.

Yet another commercially available product is the Cullmann Touring Set by Cullmann. The Cullmann Touring Set is a collection of photo equipment support devices primarily dependent on a "C" type clamp mechanism for attachment to companion support objects. Accordingly it suffers from the same serious limitations of all clamp type devices. The set also includes suction cup and spike type attachments. These attachments are very limited and do not provide the utility or convenience of my invention.

Yet another commercially available product is the Sima Video Prop by Sima. The Sima Video Prop is an extendable camera support device designed to support a camera secured on one end while the opposing end rests on the body of the user, supported additionally by a neck encircling strap. This device lacks the capability to be stably and conveniently secured to vertical or horizontal companion support objects, which is a very serious limitation when compared to my invention. Further, my invention includes the capability to support an optical device in convenient proximity to the users face and eyes while secured to the users body with a cord or strap attached to my invention and about the neck of the user.

OBJECTS AND ADVANTAGES

Accordingly, it is an object of this invention to provide a support for spotting scopes, cameras, binoculars, firearms and other devices that is easily packable and transportable by the user.

It is another object of this invention to provide such a support that is easily adjusted to a compact size and is of light weight.

It is yet another object of this invention to provide such a support that can be easily and securely attached to collateral support objects such as trees, limbs, posts, and other structures.

It is yet another object of this invention to provide such a support that can be attached easily, securely, quietly and without damage to the collateral support object, utilizing readily available securing means, such as common cord or rope.

It is yet another object of this invention to provide such a support that can be easily adjusted, both horizontally, vertically, and extendably, while attached to a companion support object or set upon a generally horizontal support surface.

It is yet another object of this invention to provide such a support that can extendably support devices, including firearms, independently of collateral support objects.

It is yet another object of this invention to provide such a support that can utilize the body of the user as a companion support object.

It is yet another object of this invention to provide such a support that includes means for adapting a variety of supported devices that do not include conventional optical device attaching means.

It is yet another object of this invention to provide such a support that includes means for attachment to planar surfaces, such as windows and the like.

It is yet another object of this invention to provide novel and versatile means for attachment of supported devices to the invention.

Still further objects and advantages will become apparent from a consideration of the ensuing description and accompanying drawings.

BRIEF DESCRIPTION OF THE DRAWINGS

FIG. 1 is a view of my device affixed to a tree (support object).

FIG. 2 is a view of my device adjusted to stand on a horizontal support surface.

FIG. 3 is an exploded view of my device depicting each major component

FIG. 4 shows a central hub member

FIG. 5 shows a cam lock knob

FIG. 8 shows a collateral support attachment member (tree leg assembly) viewed from the collateral support facing side FIG. 9 shows a collateral support attachment member (tree leg assembly) and rope gripping clamps 22A and 22B FIG. 10 shows an arm member.

FIG. 11 shows an arm member hub

FIG. 12 shows a rotating top

FIG. 12A shows a rotating top base

FIG. 13 shows a optical device ball

FIG. 14 shows an optical device attachment assembly

FIG. 14A shows a optical device attachment assembly with two optical device balls FIG. 14B is an internal view of FIG. 14A FIG. 14C shows socket plate index nubs FIG. 15 is a view of my invention in a folded state FIG. 16 is a top view of a supported device adapter fixture FIG. 16A is a bottom view of a supported device adapter fixture

Figure 6:
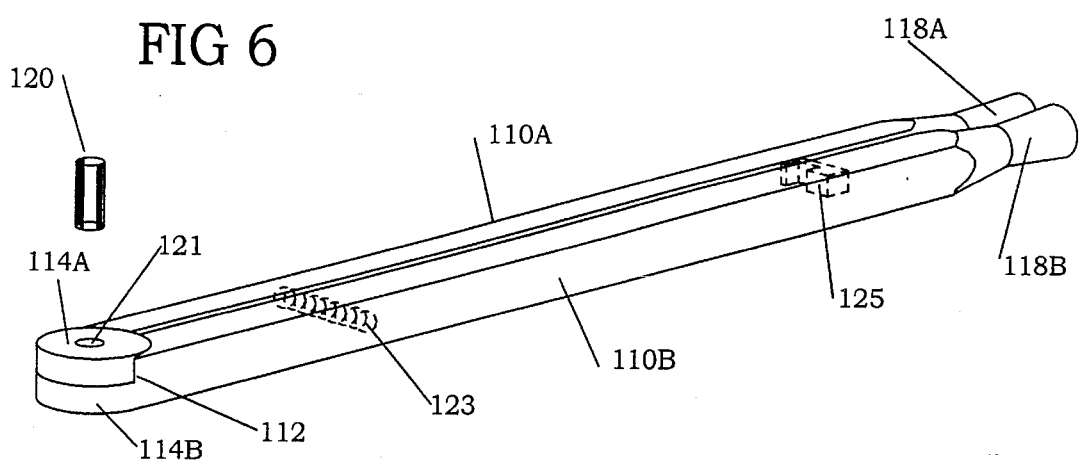
FIG. 6 shows plural elongated legs

REFERENCE NUMERALS 20 central hub member (FIG. 4)
22A rope gripping clamp (FIG. 9) (clenching means)
22B rope gripping clamp (FIG. 9) (clenching means)
26 optical device attachment assembly FIG. 14) (optical device attaching means)
27 binding means
28 rotating top (FIG. 12)
30 rotating top base (FIG. 12A)
32 arm member (FIG. 10)
34 arm member tip 36 arm member hub (FIG. 11)
38 arm member receiving opening
39 extension locks
40 arm member shaft
42A arm member hub rotation tab
42B arm member hub rotation tab
43 arm member hub mounting pin
46A arm member hub locking grooves
46B arm member hub locking grooves
48 elongated leg hub coupling cavity.
52A central hub member rotation tab
52B central hub member rotation tab
54A central hub member rotation support beam
54B central hub member rotation support beam
55A elongated leg spread limiting surface
55B elongated leg spread limiting surface
58 elongated leg hub rotation stop
60 central hub member arch
61 central hub member rotation opening
62A central hub member locking grooves
62B central hub member locking grooves
63 rope end holding slot
64 circular channel
66A cam lock ramp
66B cam lock ramp
68A cam lock ramp contact stud
68B cam lock ramp contact stud
69 central rotational axis
70 cam lock knob (FIG. 5) (tightening means)
71 central hub member bolt
72 tree leg mounting post
74 tree leg spread limiting surface
74A tree leg spread limiting point
74B tree leg spread limiting point
76 central hub member clutching edges
78A tree leg rotation bolt hole
78B tree leg rotation bolt hole
80 tree leg rotation bolt
82 tree leg assembly (FIG. 8) (collateral support attachment member)
84A tree leg limb
84B tree leg limb
84C tree leg limb
86 overlapping rotation flange
88 underlapping rotation flange
90 intermediate clutching edges
92 outer clutching edges
94A rope gripping channel
94B rope gripping channel
96 sharply corrugated walls
100 elongated leg hub member (FIG. 7)
102 elongated leg hub rotation post
104A elongated leg hub rotation tab
104B elongated leg hub rotation tab
106 elongated leg rotation joint receiving opening
108A elongated leg hub locking grooves
108B elongated leg hub locking grooves
110A elongated leg
110B elongated leg
112 elongated leg rotation joint
114A elongated leg rotation disk
114B elongated leg rotation disk
116 plural elongated leg assembly (FIG. 6)
120 elongated leg rotation bolt
121 elongated leg rotation bolt hole
122A elongated leg hub rotation bolt hole
122B elongated leg hub rotation bolt hole
123 elongated leg spread spring
125 elongated leg spread catch
126 optical device attachment unit (FIG. 13)
128 optical device mounting screw
130 pivoting ball
132 optical device mounting knob
134A socket plate
134B socket plate
136A pivoting ball receiving socket
136B pivoting ball receiving socket
138A socket plate stud
138B socket plate stud
140 rotating top base receiving opening
142 compression bolt
144 rotating top retaining groove
146 rotating top receiving end
148A screw aperture
148B screw aperture
150A conventional optical device mounting screw
150B conventional optical device mounting screw
154 optical device attachment assembly nub
156 socket plate stud receiving hole
158 compression bolt
160 supported device adapter means (FIG. 16)
162 strap receiving slots
164 adapter straps
166 supported device adapter means screw aperture
167 sling stud notch
168 window attachment adapter (FIG. 17) (planar surface attachment means)
169 arm member hub mounting stud
170 tree leg receiving aperture
172 window attachment lock knob
174 window-lapping flanges
176 window receiving gap
178 suction cup slots
180 slot engaging buttons
182 upper suction cup slots
184 suction cups
186 automobile window
188 lower suction cup slots
190 extendible elongated leg
190A extendible elongated leg
192 extendible tree leg
194 extendible tree leg mounting aperture
196 extendible tree leg mounting pin
198 rope gripping clamp

SUMMARY

My invention comprises a versatile portable support apparatus for cameras, spotting scopes, and the like. A rope is attached to a central hub member (FIG. 4), and encircled about a collateral support object, one or more times, and then placed in rope gripping clamps (FIG. 9). Arm member (FIG. 10) receives a conventional camera type attachment assembly, which adjustably receives an optical device. A collateral support attachment member, (FIG. 8), (tree leg assembly), is contiguously attached to a collateral support object with rope type binding means. FIG. 1 shows my invention attached to a collateral support object, (tree). An plural elongated leg assembly (FIG. 6) is rotatably adjustable about central hub member, (FIG. 4), so as to combine with collateral support attachment member, (FIG. 8) (tree leg assembly), to enable my support apparatus to support devices in a free standing mode. FIG. 2 shows my invention free standing on a generally horizontal surface.

PREFERRED EMBODIMENT—DESCRIPTION

General Description

A versatile portable support apparatus for cameras, spotting scopes, and other supportable devices is shown secured to a collateral support object (tree) in FIG. 1. A rope is attached to a central hub member (FIG. 4), and encircled about a collateral support object one or more times, and then tightly placed in rope gripping clamp (FIG. 9) 22A and rope gripping clamp (FIG. 9) 22B. A optical device attachment assembly (FIG. 14), is attached to a rotating top (FIG. 12), which is removably coupled to a rotating top base (FIG. 12A), with the rotating top (FIG. 12) being the female member and the rotating top base (FIG. 12A) being the male member. Arm member (FIG. 10) receives rotating top base (FIG. 12A) on arm member tip 34, with arm member tip 34 being the male member and rotating top base (FIG. 12A) being the female member. Arm member (FIG. 10), is multi-sectioned with extension locks 39.

Arm Member Hug FIG. 11:

Arm member (FIG. 10), is a conventional telescoping extendible apparatus. Arm member (FIG. 10), is coupled to central hub member (FIG. 4), by means of an arm member hub (FIG. 11), containing arm member receiving opening 38 that receives arm member shaft 40, with arm member shaft 40 being the male member and the arm member hub (FIG. 11) being the female member. Arm member hub rotation tab 42A, and arm member hub rotation tab 42B, extend from the end of arm member hub (FIG. 11) opposing arm member receiving opening 38, forming an elongated leg hub coupling cavity 48. Arm member hub rotation tab 42A and arm member hub rotation tab 42B are engraved with circular arm member hub locking grooves 46A on the inside surfaces, and engraved with arm member hub locking grooves 46B on the outside surfaces.

Central hub member FIG. 4:

Central hub member rotation tab 52A and central hub member rotation tab 52B project perpendicularly from the base of two parallel, generally rectangular vertical beams; central hub member rotation support beam 54A and central hub member rotation support beam 54B, which are archedly connected at their upper ends forming a central hub member arch 60. A central hub member rotation opening 61 is formed by the interior of central hub member arch 60 between central hub member rotation support beam 54A and central hub member rotation support beam 54B. Central hub member rotation support beam 54A and central hub member rotation support beam 54B are chamfered toward central hub member rotation opening 61 forming elongated leg spread limiting surface 55A and elongated leg spread limiting surface 55B. The apex of central hub member arch 60 forms an elongated leg hub rotation stop 58. A tree leg spread limiting surface 74 is formed by a planar surface tangent to the apex of the central hub member arch 60 A tree leg mounting post 72 extends upwardly from the tree leg spread limiting surface 74. The inside surface of central hub member rotation tab 52A is engraved with central hub member locking grooves 62A and the inside surface of central hub member rotation tab 52B is engraved with central hub member locking grooves 62B. The chamfered edges of elongated leg spread limiting surface 55A and elongated leg spread limiting surface 55B, form central hub member clutching edges 76. Tree leg rotation bolt hole 78A, penetrates tree leg mounting post 72 and receives tree leg rotation bolt 80.

Tree Leg Assembly FIG. 8: (Collateral Support Attachment Member)

Tree leg assembly (FIG. 8) is rotatably coupled to tree leg mounting post 72 by tree leg rotation bolt 80, which passes through tree leg rotation bolt hole 78B and tree leg rotation bolt hole 78A. Tree leg assembly (FIG. 8) and (FIG. 9) ascends upwardly and perpendicular from tree leg spread limiting surface 74 and is composed of tree leg limb 84A and tree leg limb 84B. Tree leg limb 84A incorporates a semicircular overlapping rotation flange 86, extending perpendicularly to the long axis of tree leg limb 84A, from the base end of tree leg limb 84A, in a plane parallel to the plane of tree leg mounting post 72, overlapping a similar underlapping rotation flange 88 that extends perpendicularly from the base end of tree leg limb 84B, in a plane parallel to the plane of tree leg mounting post 72, apositioned to overlapping rotation flange 86. Tree leg rotation bolt 80 passes through tree leg rotation bolt hole 78A and tree leg rotation bolt hole 78B, thereby allowing tree leg limb 84A and tree leg limb 84B to rotate apart from each other, with tree leg rotation bolt 80 acting as the rotation point. Tree leg limb 84A and tree leg limb 84B are shaped so that when their inside edges face each other they form a concave surface facing tree leg mounting post 72. Tree leg limb 84A and tree leg limb 84B incorporate intermediate clutching edges 90, that are parallel to outer clutching edges 92 formed by the outer long axis edges of tree leg limb 84A and tree leg limb 84B. Tree leg mounting post 72 and the lower section of combined tree leg limb 84A and tree leg limb 84B, are mateably shaped so as to allow rotation about tree leg rotation bolt 80. The outside lower corner of tree leg limb 84A and tree leg limb 84B are chamfered so as to create tree leg spread limiting point 74A and tree leg spread limiting point 74B.

Rope Gripping Clamps FIG. 8 and FIG. 9:

Rope gripping clamp (FIG. 9) 22A is attached to tree leg limb 84A and rope gripping clamp (FIG. 9) 22B is attached to tree leg limb 84B, so as to allow rope gripping channel 94A and rope gripping channel 94B to align to form a continuous rope gripping channel perpendicular to the long axis of the tree leg assembly (FIG. 8) and (FIG. 9), extending from the outer edge of tree leg limb 84A to the outer edge of tree leg limb 84B. Rope gripping clamp (FIG. 9) 22A and rope gripping clamp (FIG. 9) 22B are generally rectangular in shape, halved longitudinally by rope gripping channel 94A and rope gripping channel 94B. Rope gripping channel 94A is a syncline groove with sharply corrugated walls 96. The sharp corrugations slant from the top of the rope gripping channel 94A downwardly into the channel and inwardly toward the inside edge of the tree leg limb 84A. Rope gripping clamp (FIG. 9) 22A opposes rope gripping clamp (FIG. 9) 22B so that the sharply corrugated walls 96 of rope gripping channel 94B slants downwardly and inwardly toward the inside edge of tree leg limb 84B. Rope gripping channel 94A and rope gripping channel 94B, receives a rope or the like. Rope end holding slot 63 holds the knotted end of a rope. As the rope is drawn forcibly away from rope gripping clamp (FIG. 9) 22A, and rope gripping clamp (FIG. 9) 22B, rope gripping channel 94A, and rope gripping channel 94B, draw the rope securely toward the bottom of the channels. Rope gripping channel 94A will securely hold a rope force directed toward the outer edge of tree leg limb 84B, and rope gripping channel 94B will securely hold a rope force directed toward the outer edge of tree leg limb 84A and rope gripping channel 94A.

Figure 7:
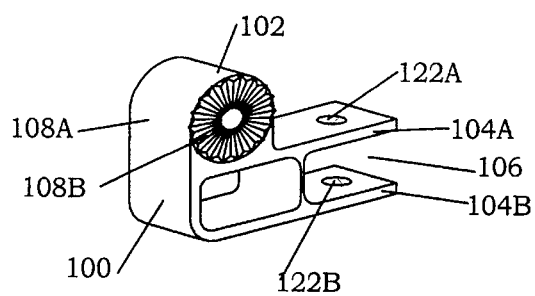
FIG. 7 shows an elongated leg hub member

Elongated Leg Hub Member, FIG. 7

An elongated leg hub rotation post 102 appears as a rounded hump projecting perpendicularly from the base end of elongated leg hub member (FIG. 7). Opposing the hump end of the elongated leg hub member (FIG. 7), are elongated leg hub rotation tab 104A, and elongated leg hub rotation tab 104B, which are formed by a traverse mortise forming elongated leg rotation joint receiving opening 106. Elongated leg hub rotation post 102 is engraved with elongated leg hub locking grooves 108A and elongated leg hub locking grooves 108B, on the outer surfaces of the humped elongated leg hub rotation post 102. Elongated leg rotation joint receiving opening 106, receives elongated leg rotation joint 112, and is secured by passing elongated leg rotation bolt 120 through elongated leg hub rotation bolt hole 122A, then through elongated leg rotation bolt hole 121, then through elongated leg hub rotation bolt hole 122B.

Plural Elongated Leg Assembly, FIG. 6

Plural elongated leg assembly (FIG. 6) is comprised of elongated leg 110A and elongated leg 110B, which are joined at elongated leg rotation joint 112. Elongated leg 110A and elongated leg 110B are rectangular or tubular legs with elongated leg foot 118A and elongated leg foot 118B located on the extended end. Elongated leg rotation disk 114A projects inwardly from the rotation joint end of elongated leg 110A, and overlaps elongated leg rotation disk 114B, which projects inwardly from the rotation joint end of elongated leg 110B. Elongated leg 110A and elongated leg 110B, are apositioned along their long axis, thus forming elongated leg rotation joint 112. Elongated leg spread spring 123, is retained between elongated leg 110A and elongated leg 110B, with the ends of elongated leg spread spring 123, housed within spring retaining holes located on the inside of elongated leg 110A and elongated leg 110B. Elongated leg spread catch 125 located on the lower inside of elongated leg 110A and elongated leg 110B, secures said plural elongated legs until spreading is desired.

Cam Lock Knob FIG. 5:

Cam lock knob (FIG. 5), contains cam lock ramp contact stud 68A and cam lock ramp contact stud 68B, bedded within a circular channel 64, carved into the inside surface of cam lock knob (FIG. 5). Cam lock ramp 66A and cam lock ramp 66B, arise circularly, in a clockwise direction, perpendicular to the outside surface of central hub member rotation tab 52B. Cam lock knob (FIG. 5) is coupled upon the outside surface of central hub member rotation tab 52B, so as to place cam lock ramp contact stud 68A in contact with the surface of cam lock ramp 66A, and cam lock ramp contact stud 68B in contact with the surface of cam lock ramp 66B. Central hub member bolt 71, passes through cam lock knob (FIG. 5), and central hub member rotation tab 52B, and arm member hub rotation tab 42B, and elongated leg hub rotation post 102, and arm member hub rotation tab 42A, and central hub member rotation tab 52A. Cam lock knob (FIG. 5) rotates clockwise causing a cam action which engages central hub member locking grooves 62A and central hub member locking grooves 62B and arm member hub locking grooves 46A and arm member hub locking grooves 46B and elongated leg hub locking grooves 108A and elongated leg hub locking grooves 108B, tightly securing rotational movement.

Optical Device Attachment Assembly, FIG. 14

Optical device attachment unit (FIG. 13), is comprised of optical device mounting screw 128, which arises from the surface of pivoting ball 130, then passes through optical device mounting knob 132. Pivoting ball 130 is pivotally ensconced between pivoting ball socket 136A, and pivoting ball socket 136B. Socket plate 134A and socket plate 134B, are rounded on each end by an arc radius equal to one-half the width of the socket plates. Socket plate stud 138A, and socket plate stud 138B are mammillated projections located on the inside surface of socket plate 134A and socket plate 134B, at the centerpoint of the arc forming the opposing end of socket plate 134A and socket plate 134B. Compression bolt 158, passes through an aperture in socket plate 134A, and socket plate 134B. An additional configuration is shown in FIG. 14B, wherein an additional optical device attachment ball 130A, is substituted for socket plate stud 138A and socket plate stud 138B. FIG. 14C shows socket plate 134C and socket plate 134D, with pivoting ball retaining nubs 131 arrayed around pivoting ball socket 136C and pivoting ball socket 136D Rotating Top FIG. 12:

Rotating top (FIG. 12) removably envelopes rotating top base (FIG. 12A) by seating rotating top base receiving opening 140, upon rotating top (FIG. 12). Rotating top (FIG. 12) is split on one side, so that compression bolt 142 passing through an aperture perpendicular to the split will clench rotating top (FIG. 12) about rotating top base (FIG. 12A) when tightened. Compression bolt 142 passes through rotating top retaining groove 144 which encircles rotating top receiving end 146, of rotating top base (FIG. 12A), preventing the removal of rotating top (FIG. 12), while compression bolt 142 is in place. Rotating top base (FIG. 12A) includes screw aperture 148A in the top end to receive a conventional optical device mounting screw 150A. Optical device attachment assembly nub 154 projects from the top of rotating top (FIG. 12). Socket plate stud receiving hole 156 penetrates optical device attachment assembly nub 154 and receives socket plate stud 138A and socket plate stud 138B, thereby pivotally attaching optical device attachment assembly FIG. 14) to rotating top (FIG. 12). Compression bolt 158 passes through apertures in the center of socket plate 134A and socket plate 134B. A screw aperture 148B in the top end of rotating top (FIG. 12) receives a conventional optical device mounting screw 150B.

Supported Device Adapter Fixture, FIG. 16

Supported device adapter fixture (FIG. 16), is in the shaped of an elongated rectangle with one concave side. The opposing side of supported device adapter fixture (FIG. 16) contains two or more strap receiving slots 162. Adapter straps 164, preferably of hook and loop material pass through strap receiving slots 162, and then encompass a supported device such as the foreend of a firearm, or other supported device unsuitable to attach directly to optical device attachment unit (FIG. 13). Supported device adapter fixture (FIG. 16) includes sling stud notch 167, to accommodate a conventional sling stud found on the foreend of a firearm. Supported device adapter fixture (FIG. 16) is removably attachable to optical device attachment assembly (FIG. 14) utilizing optical device mounting screw 128 and supported device adapter fixture screw aperture 166. Arm member hub mounting stud 169, is removeably received by arm member receiving opening 38, and held in place by arm member receiving opening pin 37, thereby demountably attaching supported device adapter fixture (FIG. 13).

Figure 17A:
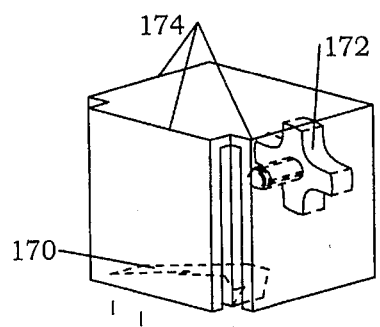
FIG. 17A shows a partial representation of a planar surface attachment adapter (window attachment adapter) mounting on a collateral support attachment member (tree leg assembly)
Figure 17B:
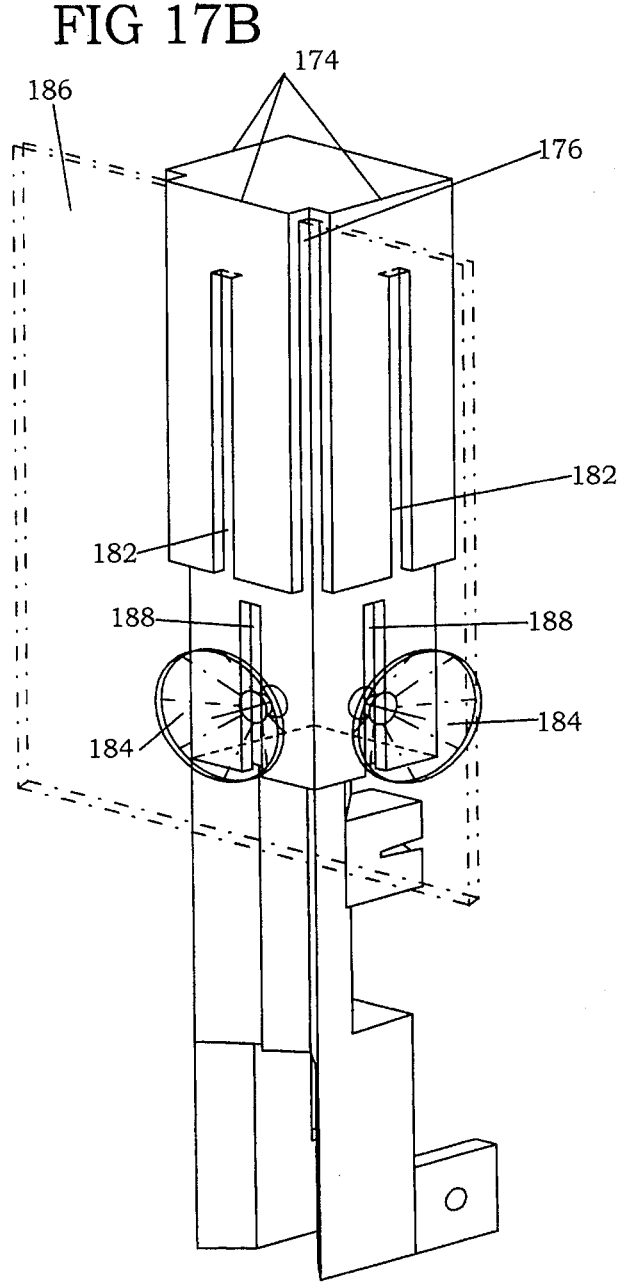
FIG. 17B shows a planar surface attachment adapter (window attachment adapter) mounted on a collateral support attachment member (tree leg assembly)

Window Attachment Adapter FIG. 17B: (Planar Surface Attachment Means)

The upper end of tree leg assembly (FIG. 8) is inserted in a tree leg receiving aperture 170, which penetrates the bottom surface of window attachment adapter (FIG. 17B) extending upwardly within the body of window attachment adapter (FIG. 17B). Window attachment lock knob 172 is then tightened upon the face of tree leg assembly (FIG. 8), tightly securing window attachment adapter (FIG. 17) on tree leg assembly (FIG. 8) Window attachment adapter (FIG. 17) has window-lapping flanges 174, on three sides, attached to the top of window attachment adapter (FIG. 17B), extending downwardly, forming a window receiving gap 176. A planar structure such as an automobile window 186 is slideably inserted into window receiving gap 176, Each of the window-lapping flanges 174, is mortised from the bottom upwardly toward the top, by upper suction cup slots 182. suction cups 184, have slot engaging buttons 180 extending from the apex. Slot engaging buttons 180 are inserted into the upper suction cup slots 182, then adjusted within upper suction cup slots 182. The main body of window attachment adapter (FIG. 17) extends downwardly below the bottom edges of window-lapping flanges 174, Lower suction cup slots 188, are mortised upwardly from the bottom of window attachment adapter (FIG. 17) to the bottom edge of window-lapping flanges 174, in the side and rear surfaces of the main body of window attachment adapter (FIG. 17).

PREFERRED EMBODIMENT—OPERATION

Vertical Collateral Support Position, FIG. 1:

As can be seen in FIG. 1, my invention is securely attached to a vertical collateral support object, in this case, a tree. The concave surfaces of Central hub member (FIG. 4), and tree leg assembly (FIG. 8), are adjacent to the tree, and a rope is circled about the tree one or more times, then pulled tight and placed in rope gripping clamp (FIG. 9) 22A, and rope gripping clamp (FIG. 9) 22B. The sharply corrugated walls 96 within rope gripping channel 94A and rope gripping channel 94B, draw the rope securely down into the clamp as pulling force is applied to the rope. The rope originates from rope end holding slot 63, and is held there by means of a simple knot in the end of the rope. The clamps are configured so as to provide a firm grip on the rope when inserted into the clamps and then pulled in either direction, enabling the user to wrap the rope in either a clockwise or counter-clockwise direction around the collateral support object. The inside surface of tree leg assembly (FIG. 8), features outer clutching edges 92 and intermediate clutching edges 90, and Central hub member (FIG. 4) features central hub member clutching edges 76. These edges serve to grip the surface of the collateral support object providing additional stability. FIG. 1 configuration is achieved by rotatably releasing cam lock pressure by rotating cam lock knob (FIG. 5), which disengages central hub member locking grooves 62A and central hub member locking grooves 62B and arm member hub locking grooves 46A and arm member hub locking grooves 46B and elongated leg hub locking grooves 108A and elongated leg hub locking grooves 108B. Cam lock knob (FIG. 5), therefore provides the central locking control so that tree leg assembly (FIG. 8), arm member (FIG. 10), and elongated leg hub member (FIG. 7) are rotatably adjustable, about central rotational axis 69.

When affixed as shown in FIG. 1, my invention is both rotatably adjustable as to elevation, and extendably adjustable as to distance from the collateral support object. These features are provided by releasing cam lock pressure with cam lock knob (FIG. 5) for vertical adjustment of arm member (FIG. 10), and releasing extension locks 39, to enable telescopic extension of arm member (FIG. 10). It will be readily apparent that other extension methods or apparatus could be employed, such as a folding arm member or a sectioned arm member utilizing elbow joints. Such adjustability enables the user to utilize an almost limitless variety of collateral support objects. My invention is easily secured to objects that are at any angle, and of nearly any size, such as tree limbs, tree trunks, fence posts, fence rails, light poles, automobile door posts, walking staffs, ski poles, skis, and many other collateral support objects.

Anyone who has tried to support optical devices while afield will readily appreciate the utility of this novel approach. Hikers, hunters, skiers, bird watchers, photographers or other outdoor users will now be enabled to support optical and other devices at conveniently useful heights, individually adjustable to the users own convenience and the demands of the terrain. Users will no longer be limited by conventional highly limited clamping devices currently provided, nor will users be constrained by straps, belts or other attachment means of limited length. Try to find a piece of Velcro while afield and faced with a tree too large for the strap at hand. My novel approach enables the use of readily obtainable rope, in any length desired, and provides clever means to tightly ,easily and releasable secure such rope with no need to tie knots or such, and avoiding the troublesome limitations of Velcro, such as a propensity to tangle and stick upon itself and objectionable noise, especially to hunters and bird watchers and photographers.

Central Hub Member FIG. 4:

Central hub member (FIG. 4) and arm member hub (FIG. 11) and elongated leg hub member (FIG. 7), are engraved with central hub member locking grooves 62A and central hub member locking grooves 62B, and arm member hub locking grooves 46A and arm member hub locking grooves 46B and elongated leg hub locking grooves 108A and elongated leg hub locking grooves 108B, matebly located on central hub member rotation tab 52A and central hub member rotation tab 52B and arm member hub rotation tab 42A and arm member hub rotation tab 42B and elongated leg hub rotation tab 104A and elongated leg hub rotation tab 104B. Cam lock knob (FIG. 5), is matebly mounted on the outer surface of central hub member rotation tab 52B, thereby engaging cam lock ramp 66A in contact with cam lock ramp contact stud 68A, and cam lock ramp 66B in contact with cam lock ramp contact stud 68B. Cam lock knob (FIG. 5) is rotated clockwise, resulting in cam action tightening of all of the mated and engaged locking grooves. Rotating cam lock knob (FIG. 5) counter-clockwise unlocks all locking grooves and allows free rotation of central hub member (FIG. 4), arm member hub (FIG. 11 ) and elongated leg hub member (FIG. 7).

Arm Member FIG. 10:

Arm member (FIG. 10) is a telescoping sectional apparatus. Arm member (FIG. 10) provides additional positional capability, in that a supported device is easily raised and lowered when my invention is in a vertical mode, and easily extended or retracted when affixed to a collateral support object. Arm member hub (FIG. 11 ), receives a variety of currently available telescoping apparatuses.

Optical Device Attachment Assembly FIG. 14:

Although my invention provides the convenience and versatility of utilizing a variety of conventional camera type supported device attachment and panning devices through the use of conventional optical device mounting screw 150A or conventional optical device mounting screw 150B, I have furnished a novel and improved version of a conventional socket plate panning device. Optical device attachment assembly FIG. 14) is removably attacheable to optical device attachment assembly nub 154 by engaging socket plate stud 138A and socket plate stud 138B in socket plate stud receiving hole 156. Optical device attachment ball (FIG. 13) 126 is ensconced between socket plate 134A and socket plate 134B, and contained within pivoting ball receiving socket 136A and pivoting ball receiving socket 136B. Optical device attachment ball (FIG. 13) is precisely built so that the bottom surface of optical device mounting knob 132 is in continual contact with the edges of socket plate 134A and socket plate 134B. Concurrently, the thickness of optical device attachment assembly nub 154 is matched to the diameter of pivoting ball 130, so that compression bolt 158, will first tighten socket plate stud 138A and socket plate stud 138B on optical device attachment assembly nub 154, thereby preventing rotational movement, but at the same time allowing just enough looseness so that optical device attachment ball (FIG. 13) can be pivoted to either elongated side of optical device attachment assembly FIG. 14), as shown in FIG. 3. This provides a stable platform for a optical device while still allowing horizontal panning. Further tightening of compression bolt 158 will lock optical device attachment ball (FIG. 13) preventing such panning motion. Unlike past versions of socket plate support assemblies, optical device attachment ball (FIG. 13) will not wobble or fall vertically. This is due to the flush mounting of optical device mounting knob 132 upon the edges of socket plate 134A and socket plate 134B. Such design will prevent a optical device from vertical instability when optical device attachment assembly FIG. 14) is adjusted so as to allow pivoting ball 130 to rotate in a horizontal panning motion. Optical device attachment assembly FIG. 14) is adjustable to accommodate any configured setup of my invention, whether on a collateral support object of any kind, or placed upon a horizontal support surface in an upright stance. An additional configuration is shown in FIG. 14A, and FIG. 14B, wherein an additional optical device attachment ball 136C, replaces socket plate stud 138A and socket plate stud 138B. Socket plate 134C and socket plate 134D have socket plate index nubs 131, arrayed around pivoting ball socket 136C and pivoting ball socket 136D as shown in FIG. 14C. Said configuration FIG. 14A, and FIG. 14B, and FIG. 14C, result in pivoting ball 130A being demountably affixed to conventional optical device mounting screw 150A or 150B. The shaft of pivoting Ball 130, is held in adjustable position by socket plate index nubs 131, preventing vertical rotation of pivoting ball 130, when loose enough to allow horizontal panning. Adjusting compression bolt 158 tightness, enables rotational and pivotal adjustment of both pivoting ball 130A and 130. Pivoting ball 130A become tightened while still allowing stable panning rotation of pivoting ball 130.

Rotating Top FIG. 12:

Rotating top (FIG. 12) is rotatably and demountably fitted on rotating top base (FIG. 12A). Compression bolt 158 passes through rotating top retaining groove 144, thereby preventing removal of rotating top (FIG. 12). Rotating top (FIG. 12) is slotted from the lower end upwardly to optical device attachment assembly nub 154. Tightening or loosening compression bolt 158 compresses or releases the slot in rotating top (FIG. 12) thereby enabling rotating top (FIG. 12) 28 to be rotated horizontally around rotating top base (FIG. 12A) or locked in position as desired. This rotational movement provides additional vertical panning capabilities when my invention is configured in a generally horizontal mode, and additional horizontal panning capabilities when configured in a vertical mode.

Folded Position FIG. 15:

FIG. 15, shows my invention in a folded state. Releasing cam lock knob (FIG. 5), enables rotation of Central hub member (FIG. 4) with attached tree leg assembly (FIG. 8) clockwise until in parallel contact with the upper side of arm member (FIG. 10). Concurrently, plural elongated leg assembly (FIG. 6) is rotated counter-clockwise until in parallel contact with the bottom side of arm member (FIG. 10). Tightening cam lock knob (FIG. 5) locks said support apparatus into a folded state as seen in FIG. 15.

Horizontal Support Position FIG. 2:

For those occasions when a user is not proximate to any suitable collateral support object, my invention is easily, quickly and quietly re-configured to rest on any generally horizontal surface. FIG. 2 depicts such a configuration, From any previous configuration, holding arm member (FIG. 10) vertically, cam lock knob (FIG. 5) is released thereby allowing the free rotation of Central hub member (FIG. 4) and plural elongated leg assembly (FIG. 6) downward and away from arm member (FIG. 10). Disconnecting elongated leg spread catch 125 results in elongated leg spread spring 123 springably forcing elongated leg 110A and elongated leg 110B apart rotating about elongated leg rotation joint 112. As elongated leg hub member (FIG. 7) is rotated downward, the upper outer sides of elongated leg 110A and elongated leg 110B come in contact with elongated leg spread limiting surface 55A and elongated leg spread limiting surface 55B. Elongated leg hub member (FIG. 7) rotates clockwise, interposed between central hub member rotation support beam 54A and central hub member rotation support beam 54B, occupying central hub member rotation opening 61, and concurrently, central hub member (FIG. 4), rotates counter-clockwise causing central hub member rotation support beam 54A and central hub member rotation support beam 54B to straddle elongated leg hub member (FIG. 7). Such rotation of elongated leg hub member (FIG. 7) and central hub member (FIG. 4), is halted when elongated leg hub member (FIG. 7) encounters elongated leg hub rotation stop 58. Tightening cam lock knob (FIG. 5) 70 locks my invention in a generally upright vertical position, convenient for placement on any suitable generally horizontal surface, as shown in FIG. 2, Elongated leg spread spring 123, maintains elongated leg 110A and elongated leg 110B, in a variable spread apart position, regulated by abutment with elongated leg spread limiting surface 55A and elongated leg spread limiting surface 55B. As configured in FIG. 2, central hub member (FIG. 4) and tree leg assembly (FIG. 8) are positioned as the third leg in a tripod. Spreadably rotating tree leg limb 84A and tree leg limb 84B, quickly and easily results in four point contact with the support surface, thereby providing additional stability. The angle of spread between tree leg limb 84A and tree leg limb 84B is limited when tree leg spread limiting point 74A and tree leg spread limiting point 74B abut tree leg spread limiting surface 74. Such adjustments accommodate varied support surfaces and terrain. When configured as in FIG. 2, arm member (FIG. 10) is vertically extendably adjustable for convenient positioning of a supported device.

Hand Held Use:

My invention is also adjustable so as to provide hand-held and body-held support for optical devices. Rotating central hub member (FIG. 4) upwardly to a more or less vertical position, enables placing of central hub member (FIG. 4) and attached tree leg assembly (FIG. 8), against the shoulder or other part of the users body to provide valuable added stability for a camera, spotting scope, or the like. Additionally, a rope can be configured as a neck encircling lanyard to stably position an optical device or the like upon the front portion of the users body, positioning the supported device at the eye of the user.

Figures 19, 19A:
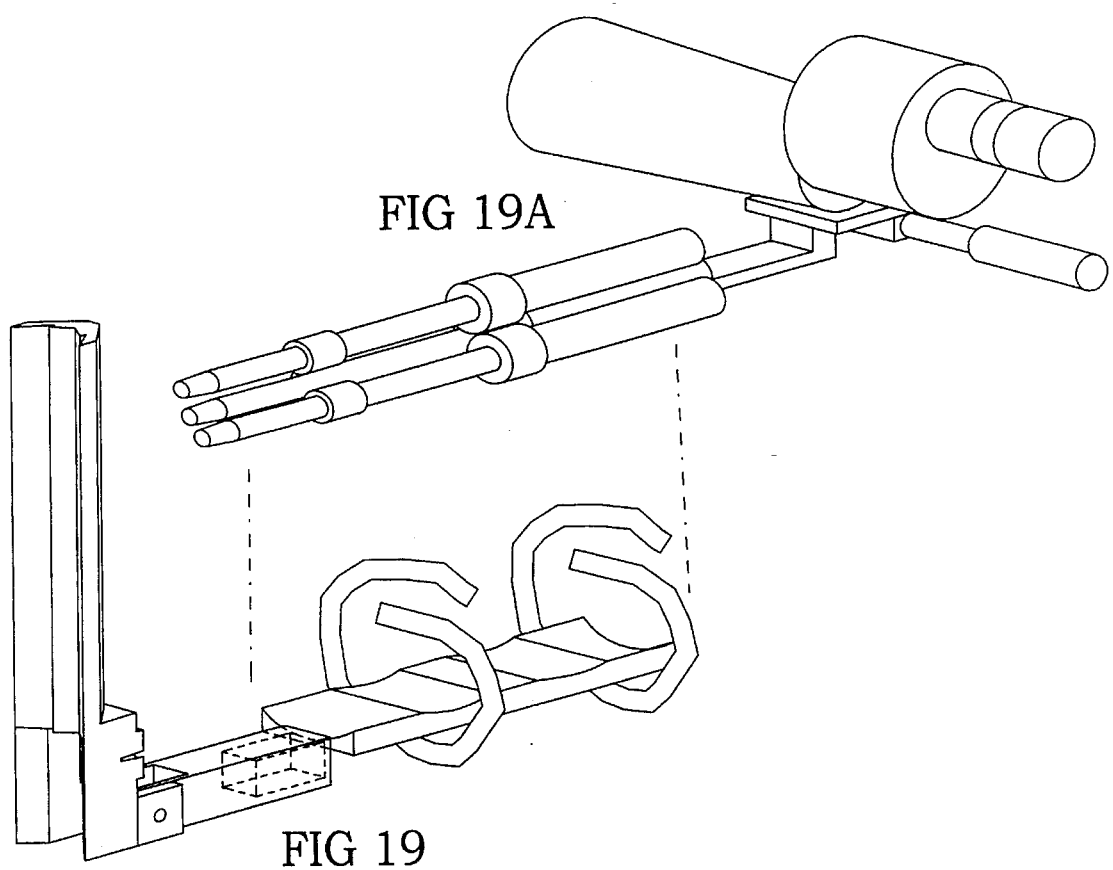
FIG. 19 shows a supported device adapter fixture (FIG. 16) removably mounted on arm member hub (FIG. 11)
FIG. 19A is a conventional camera type tripod, removably mountable upon supported device adapter fixture, (FIG. 16), to be secured by adapter straps 164.

Supported Device Adapter Fixture FIG. 16:

FIG. 2, shows supported device adapter fixture (FIG. 16) mounted upon optical device attachment assembly FIG. 14). Supported device adapter fixture (FIG. 16) is attachable to supported objects that do not possess a suitable screw aperture connection point to receive optical device mounting screw 128. Positioning the concave surface of supported device adapter fixture (FIG. 16) on the underside of the forearm of a firearm, and encircling the upper portion of the firearm with preferably Velcro adapter straps 164, provides a supported device adapter fixture screw aperture 166, to receive optical device mounting screw 128, thereby enabling my invention to act as an adjustable bi-pod firing support. Similarly attached to other supported devices, such as binoculars, laid crosswise within binocular cutouts, supported device adapter fixture (FIG. 16), affords all of the benefits of my invention to a plurality of supportable devices. FIG. 19 shows supported device adapter fixture (FIG. 16), affixed to arm member hub (FIG. 11), and FIG. 19A shows a conventional photographic tripod proximate to, and mountable on, supported device adapter fixture (FIG. 16).

Window Attachment Adapter FIG. 17: (Planar Surface Attachment Means)

FIG. 17 shows operation and attachment of window attachment adapter (FIG. 17). The purpose of such an adapter is to enable the use of an automobile window, or the like, as a collateral support object. Window attachment adapter (FIG. 17), is mounted on the upper end of tree leg assembly (FIG. 8), as shown in FIG. 17A, by inserting tree leg assembly (FIG. 8) into tree leg receiving aperture 170. Tightening window attachment lock knob 172 secures window attachment adapter (FIG. 17) tightly. The combined assembly as shown in FIG. 17B, enables automobile window 186, to be slideably inserted into window receiving gap 176. Three window-lapping flanges 174 enable mounting the combined assembly FIG. 17B, positioning arm member (FIG. 10), parallel to automobile window 186, or perpendicular to automobile window 186. Lower suction cup slots 188, slideably adjustably receive slot engaging buttons 180, positioning suction cups 184 below window-lapping flanges 174, suckingly attached to automobile window 186, providing additional stability. Upper suction cup slots 182, also receive suction cups 184, and further enable the combined assembly FIG. 17B, to be suckingly mounted on other smooth surfaces.

Although my invention can be constructed of a wide variety of materials including plastic, composite materials, fiberglass, aluminum, wood, and the like, my invention is preferably constructed of a combination of suitable plastic or composite materials, and aluminum. As is readily apparent, my invention can be constructed in any size, to accommodate the desires and needs of a user. Any part of my invention can be constructed in varying relative sizes, such as longer or shorter, arm member (FIG. 10), and tree leg assembly (FIG. 8), and plural elongated leg assembly (FIG. 6). Non-functional edges and contours are readily rounded, smoothed or shaped for weight saving, and aesthetics.

OTHER EMBODIMENTS

One Piece Tree Leg—(Collateral Support Attachment Member) Description

Figure 18:
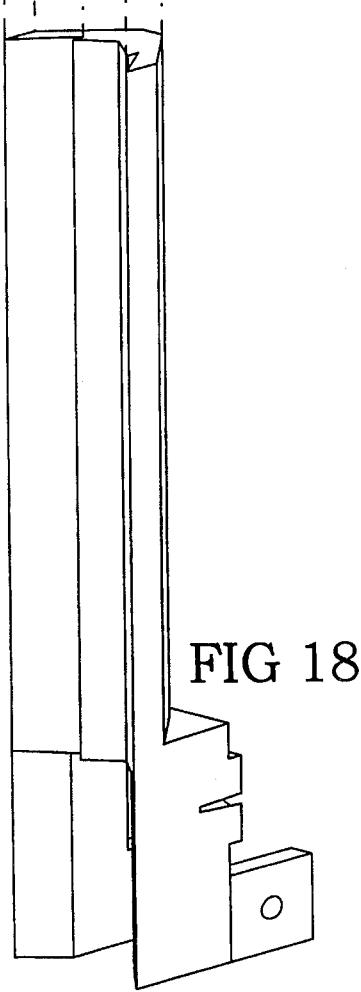
FIG. 18 shows a one piece collateral support attachment member (tree leg assembly), with rope gripping clamp 198 channeled in central hub member (FIG. 4)

An additional embodiment provides a one piece tree leg assembly, FIG. 18, which has one tree leg limb 84C, having the same shape as combined tree leg limb 84A and tree leg limb 84B but not having the capability to spread apart.

One Piece Tree Leg—(Collateral Support Attachment Member) Operation

My invention embodied with one piece tree leg limb 84C, operates the same in all respects as a preferred embodiment, except without the capability to spread apart tree leg limb 84A and tree leg limb 84B.

Extendible Tree Leg and Extendible Elongated Legs—Description

Figure 20:
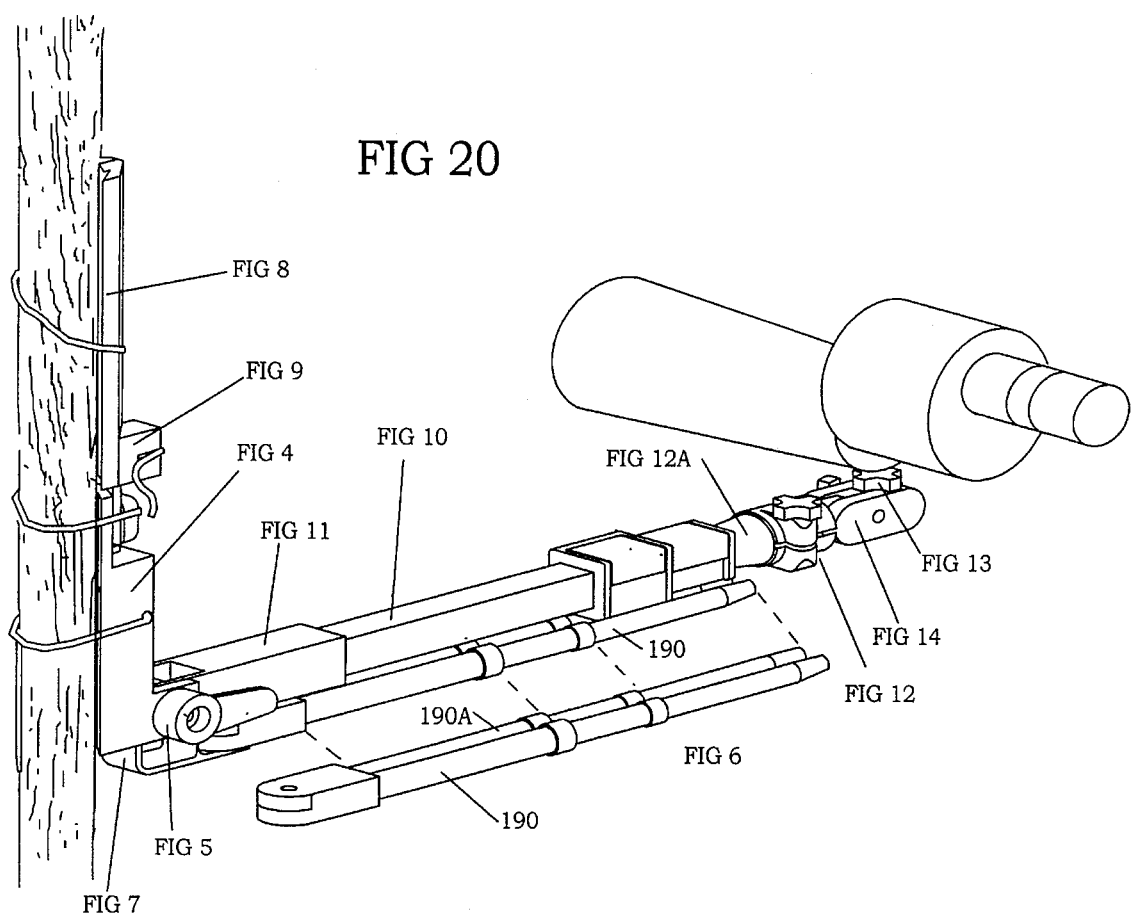
FIG. 20 shows the replacement of elongated legs 110A and 110B by extendable elongated legs 190A and 190B.
Figure 21:
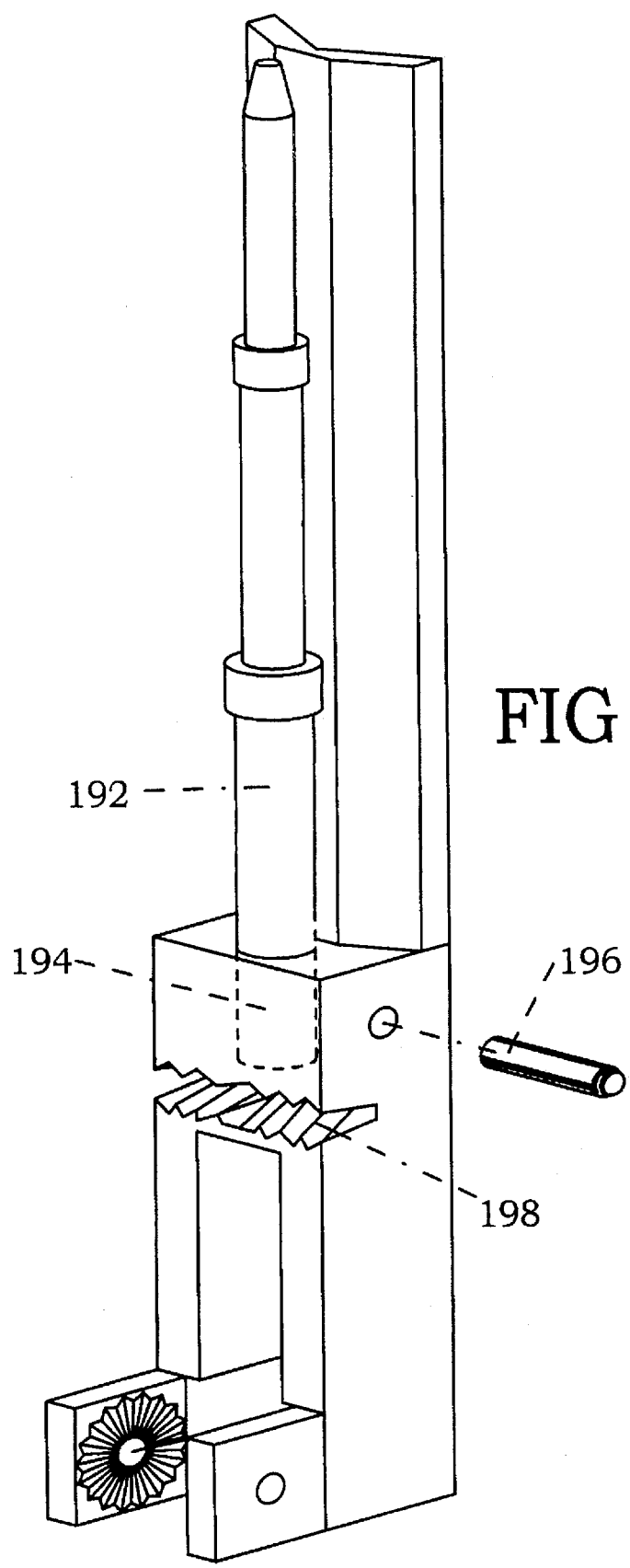
FIG. 21 shows addition of extendable tree leg 192, removably mounted on central hub member (FIG. 4), and rope gripping clamp 198, channelled on central hub member (FIG. 4) rather than channelled on collateral support attachment member (tree leg assembly) (FIG. 8).

FIG. 20 and 21 show yet another embodiment of my invention. FIG. 19 shows long leg 110A and long leg 110B, replaced by extendible long leg 190., and extendible long leg 190A. FIG. 21 shows extendible tree leg 192, removably mounted behind and parallel to the convex face of tree leg assembly (FIG. 8), inserted into extendible tree leg mounting aperture 194, held in place by extendible tree leg mounting pin 196. Rope gripping clamp 198, is channelled on Central hub member Assembly (FIG. 4), rather than tree leg assembly (FIG. 8). Such a configuration enables the extendible adjustment of extendible long leg 190 and extendible long leg 190A, and extendible tree leg 192, to meet the needs of the user.

Extendible Tree Leg and Extendible Elongated Legs—Operation

FIG. 20 and FIG. 21 depict my invention having, in addition to all aforementioned and other capabilities, extendably adjustable legs, extendible long leg 190, and extendible long leg 190A, and extendible tree leg 192, which enable a user to extendably adjust legs, as well as arm member (FIG. 10). Rope gripping clamp 198, is shown channelled on Central hub member Assembly (FIG. 4), to receive and securely hold a mounting rope or the like. Such adjustability provides additional utility to my invention.

CONCLUSIONS, RAMIFICATIONS, AND SCOPE

Accordingly, it can be seen that I have provided a novel and versatile invention, that provides convenient and steady support for cameras, scopes, and the like. Capable of being compact and lightweight, my invention meets the needs of those outdoor users of objects benefiting from steady support. Serious limitations found in conventional support tools are overcome by my invention. Trees and limbs, fence posts and railings, automobile windows, tables, automobile hoods, horizontal and irregular terrain, utility poles, and the like, at any angle, large or small in size, will serve as collateral support objects. Utilizing readily available rope, avoiding clumsy and noisy Velcro straps, puts the user in charge, instead of the tool. Tightly securable with no knots to tie, means fast and easy attachment to collateral support objects. One half turn of one cam lock knob (FIG. 5), frees a central rotational assembly, affording deployment and precise positioning, relative to the user and chosen collateral support object, as well as compact folding for transport. A users choice of optical device attachment assemblies, use of long, short, extendable or non-extendable conventional telescoping or folding arms, and/or legs, add to the versatility and utility of my invention. Attachment of supported objects not configured for conventional optical device mounting screw 128, including conventional tripods, firearms, umbrellas, motion detectors, binoculars, and the like, is accomplished using supported device adapter fixture (FIG. 16). Convenient attachment to automobile windows and the like is accomplished using window attachment adapter (FIG. 17). (Planar surface attachment means)

Although the description above contains many specificities, these should not be construed as limiting the scope of the invention but as merely providing illustrations of some of the presently preferred embodiments of this invention. Various other embodiments and ramifications are possible within it's scope. For example, arm member (FIG. 10), fashioned so as to be fixed, not extendible. Arm member (FIG. 10), fashioned so as to unfold in sections, carpenters rule like. Arm member (FIG. 10), fashioned so as to extend sections with elbow-like connections. Tree leg assembly (FIG. 8), fashioned so as to be extendible. Central hub member locking grooves replaced with conventional friction locking means. Rope gripping clamp (FIG. 9) 22A, and rope gripping clamp (FIG. 9) 22B, replaced or supplemented with any of a wide variety of conventional binding and clamping means. Cam lock knob (FIG. 5), replaced with conventional screw on knob. Use of straps, Velcro, snaps and/or buckles and/or conventional strap clamping devices or the like, replacing or supplementing a rope clamping system. Use of a detachable, or permanently affixed, tree leg assembly (FIG. 8), (FIG. 18). Tree leg assembly (FIG. 8), (FIG. 18), attachable to conventional tripods and/or conventional photographic light stand assemblies.

Thus the scope of the invention should be determined by the appended claims and their legal equivalents, rather than by the examples given.

What is claimed is:

1. A support apparatus for optical devices, comprising:
   a central hub member, which fixedly or removably receives a collateral support attachment member on one end, and has means to rotatably interconnect with an arm hub member on the opposing end;
   said arm hub member rotatably interconnects with said central hub member, thereby forming a central rotational axis about which said central hub member, and said arm hub member can rotate in relation to one another;
   said arm hub member fixedly or removably receives an arm member;
   said arm member has an optical device attachment means;
   tightening means for allowing or restricting rotation of said arm hub member and said central hub member about said central rotational axis;
   binding means for attaching to objects, and clenching means for securing said binding means; and
   fixed or removable plural elongated legs, said plural elongated legs enabling said support apparatus to be free standing.

2. The support apparatus of claim 1, wherein said plural elongated legs are adjustably attached to an elongated leg hub member;
   said elongated leg hub member is rotatably interconnected to said central hub member and said arm hub member, so that said tightening means allows or restricts rotational adjustment of said central hub member, said elongated leg hub member, and said arm hub member about said central rotational axis, so as to be disposed in either a first, second, or third configuration;
   said first configuration enables said support apparatus to be bound to an object;
   said second configuration enables said support apparatus to be free standing;
   said third configuration enables said central hub member, said arm hub member, said arm member, said elongated leg hub member, and said plural elongated legs, to be disposed in a substantially parallel orientation.

3. The support apparatus of claim 1, wherein said collateral support attachment member is adjustably bifurcated.

4. The support apparatus of claim 1, further including supported device adapter means to hold devices, when such devices are unsuitable to be held by said optical device attachment means.

5. The support apparatus of claim 1, further including flat planar surface attachment means to attach said support apparatus to generally flat planar surfaces.

6. The support apparatus of claim 1, wherein said central hub member and said collateral support attachment member are a singular unit.

7. The support apparatus of claim 1, wherein said arm member is extendible.

8. The support apparatus of claim 2, wherein said arm member is extendible.

9. The support apparatus of claim 1, wherein said plural elongated legs, said central hub member, and said collateral support attachment member have means for extension.

10. The support apparatus of claim 2, wherein said plural elongated legs, said central hub member, and said collateral support attachment member have means for extension.

11. The support apparatus of claim 1, further including an optical device attachment assembly comprising;
    two socket plates, with each said socket plate having a pivoting ball receiving socket on one end, and either, an opposing pivoting ball receiving socket, or a socket plate stud on the opposing socket plate end, and;
    which said socket plates have socket plate index nubs arrayed around said pivoting ball receiving socket, and;
    a pivoting ball, which said pivoting ball has optical device optical device attachment means, and;
    which said socket plates are apositioned, and;
    which said pivoting ball is ensconced within said pivoting ball receiving sockets, and;
    which said socket plates are connected by a compression means, and;
    which said optical device attachment assembly is dimensioned so as to fixedly tighten said opposing socket plate end, while concurrently allowing said pivoting ball to securely rotate, and further, to fixedly tighten said pivoting ball with additional tightening of said compression means, and;
    which said socket plate index nubs are arrayed so as to entrap said optical device mounting screw when moderately tightened, thereby preventing vertical rotation of said pivoting ball, while concurrently allowing horizontal rotation of said pivoting ball.

12. A support apparatus for optical devices comprising:
    a central hub member which has a collateral support attachment member on one end, and means for rotatably interconnecting with an arm member on the opposing end;
    said arm member has means to rotatably interconnect with said central hub member on one end and an optical device attachment means on the opposing end;
    when said central hub member and said arm member are interconnected, a central rotational axis is formed about which said central hub member and said arm member can rotate in relation to one another;
    tightening means for allowing or restricting rotation of said arm member and said central hub member about said central rotational axis;
    binding means for attaching to objects and clenching means for said binding means; and
    fixed or removable plural elongated legs, said plural elongated legs enabling said support apparatus to be free standing.

13. The support apparatus of claim 12, wherein said plural elongated legs are adjustably attached to an elongated leg hub member;
    said elongated leg hub member is rotatably interconnected to said central hub member and said arm member, so that said tightening means allows or restricts rotational adjustment of said central hub member, said elongated leg hub member, and said arm member about said central rotational axis, so as to be disposed in either a first, second, or third configuration;

said first configuration enables said support apparatus to be bound to an object;

said second configuration enables said support apparatus to be free standing;

said third configuration enables said central hub member, said arm member, said elongated leg hub member, and said plural elongated legs, to be disposed in a substantially parallel orientation.

14. The support apparatus of claim 12, in which said collateral support attachment member is adjustably bifurcated.

15. The support apparatus of claim 12, further including supported device adapter means to hold devices, when such devices are unsuitable to be held by said optical device attachment means.

16. The support apparatus of claim 12, further including flat planar surface attachment means to attach said support apparatus to generally flat planar surfaces.

17. The support apparatus of claim 12, wherein said central hub member and said collateral support attachment member are a singular unit.

18. The support apparatus of claim 12, wherein said arm member is extendible.

19. The support apparatus of claim 13, wherein said arm member is extendible.

20. The support apparatus of claim 12, wherein said plural elongated legs are extendible and said central hub member has means for extension.

21. The support apparatus of claim 13, wherein said plural elongated legs are extendible and said central hub member has means for extension.

22. The support apparatus of claim 12, further including an optical device attachment assembly which comprises;

two socket plates, with each said socket plate having a pivoting ball receiving socket, on one end, and either, an opposing pivoting ball receiving socket, or a socket plate stud on the opposing socket plate end, and;

which said socket plates have socket plate index nubs arrayed around said pivoting ball socket, and;

a pivoting ball, which said pivoting ball has optical device optical device attachment means, and;

which said socket plates are apositioned, and;

which said pivoting ball is ensconced within said pivoting ball socket, and;

which said socket plates are connected by a compression means, and;

which said optical device attachment assembly is dimensioned so as to fixedly tighten said opposing socket plate end, while concurrently allowing said pivoting ball to securely rotate, and further, to fixedly tighten said pivoting ball with additional tightening of said compression means, and;

which said socket plate index nubs are arrayed so as to entrap said optical device mounting screw when moderately tightened, thereby preventing vertical rotation of said pivoting ball, while concurrently allowing horizontal rotation of said pivoting ball.

23. A collateral support apparatus comprising:

a collateral support attachment means which rotatably receives a fixed or removable arm member:

fixed or removable plural elongated legs are adjustably received by said collateral support attachment means so as to enable said collateral support apparatus to be disposed as freestanding;

said arm member has an optical device attachment means, and;

a flexible binding means is secured by a rope gripping clamp so as to attach said collateral support apparatus to an object.

24. The support apparatus of claim 23, wherein said arm member is extendible.

25. The support apparatus of claim 24, wherein said plural elongated legs are extendible.

26. The support apparatus of claim 25, wherein said collateral support attachment means is extendible.

27. The support apparatus of claim 23, further including an optical device attachment assembly which comprises:

two socket plates, with each said socket plate having a pivoting ball receiving socket on one end, and either an opposing pivoting ball receiving socket or a socket plate stud on the opposing socket plate end;

wherein said socket plates have socket plate index nubs arrayed around said pivoting ball including said socket;

a pivoting ball, optical device attachment means;

said socket plates are apositioned;

said pivoting ball is ensconced within said pivoting ball socket;

said socket plates are connected by a compression means;

said optical device attachment assembly is dimensioned so as to fixedly tighten said opposing socket plate end, while concurrently allowing said pivoting ball to securely rotate, and further to fixedly tighten said pivoting ball with additional tightening of said compression means; and said socket plate index nubs are arrayed so as to entrap an optical device mounting screw when moderately tightened, thereby preventing vertical rotation of said pivoting ball, while concurrently allowing horizontal rotation of said pivoting ball.

* * * * *